(12) United States Patent
Mbamalu

(10) Patent No.: US 10,773,834 B2
(45) Date of Patent: *Sep. 15, 2020

(54) REUSABLE VERTICAL TAKE-OFF AND LANDING SPACE LAUNCH VEHICLE

(71) Applicant: Othniel Mbamalu, Lomita, CA (US)

(72) Inventor: Othniel Mbamalu, Lomita, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/037,486

(22) Filed: Jul. 17, 2018

(65) Prior Publication Data

US 2019/0009933 A1 Jan. 10, 2019

Related U.S. Application Data

(63) Continuation of application No. 15/449,921, filed on Mar. 4, 2017, now Pat. No. 10,023,329.

(51) Int. Cl.
*B64G 1/62* (2006.01)
*B64G 1/00* (2006.01)
*B64G 1/58* (2006.01)

(52) U.S. Cl.
CPC ............ *B64G 1/62* (2013.01); *B64G 1/002* (2013.01); *B64G 1/58* (2013.01)

(58) Field of Classification Search
CPC ............ B64G 1/40; B64G 1/401; B64G 1/52
See application file for complete search history.

(56) References Cited

U.S. PATENT DOCUMENTS

| | | | | |
|---|---|---|---|---|
| 3,618,860 A * | 11/1971 | Parilla | .................. | F02K 9/97 239/265.11 |
| 3,806,064 A * | 4/1974 | Parilla | .................. | F02K 9/80 244/169 |
| 3,888,419 A * | 6/1975 | McCullough | .......... | F02K 9/84 239/265.19 |
| 5,201,832 A * | 4/1993 | Porter | .................. | B64G 1/401 244/110 D |
| 6,213,431 B1 * | 4/2001 | Janeke | .................. | B64G 1/40 244/171.1 |
| 6,516,605 B1 * | 2/2003 | Meholic | ................ | F02K 7/075 60/247 |
| 6,629,416 B1 * | 10/2003 | Johnson | .................. | F02K 9/97 239/265.17 |
| 10,023,329 B1 * | 7/2018 | Mbamalu | .............. | B64G 1/62 |
| 2004/0016835 A1 * | 1/2004 | Casalmir | ............ | B02C 19/065 241/39 |
| 2005/0188677 A1 * | 9/2005 | Nyberg | .................. | F02K 9/08 60/234 |
| 2007/0163227 A1 * | 7/2007 | Mano | .................. | F02K 9/86 60/200.1 |

(Continued)

OTHER PUBLICATIONS

Samuel Coniglio; Aerospike Engine; Jan. 26, 2014; YouTube; <https://www.youtube.com/watch?v=EWf4iOMSPNc>. (Year: 2014).*

*Primary Examiner* — Richard R. Green
*Assistant Examiner* — Michael A. Fabula
(74) *Attorney, Agent, or Firm* — Matthew M. Googe; Robinson IP Law, PLLC

(57) ABSTRACT

A space vehicle includes: an aerospike nozzle formed on an aft end of the vehicle; a truncated spike including an outer edge and a surface formed on a rear portion of the truncated spike; and an annular ring outlet formed at the aft end of the vehicle between the outer edge of the truncated spike and an inner edge of the aft end of the space vehicle.

3 Claims, 4 Drawing Sheets

(56) References Cited

U.S. PATENT DOCUMENTS

| | | | |
|---|---|---|---|
| 2009/0211225 A1* | 8/2009 | Nyberg | F02K 9/62 |
| | | | 60/242 |
| 2012/0067983 A1* | 3/2012 | Czingon | C21C 5/4606 |
| | | | 239/589 |
| 2012/0175457 A1* | 7/2012 | Hunter | F41A 1/02 |
| | | | 244/3.22 |
| 2013/0298523 A1* | 11/2013 | Sims | F02K 1/00 |
| | | | 60/200.1 |
| 2015/0175278 A1* | 6/2015 | Hunter | F41F 3/04 |
| | | | 244/158.5 |

* cited by examiner

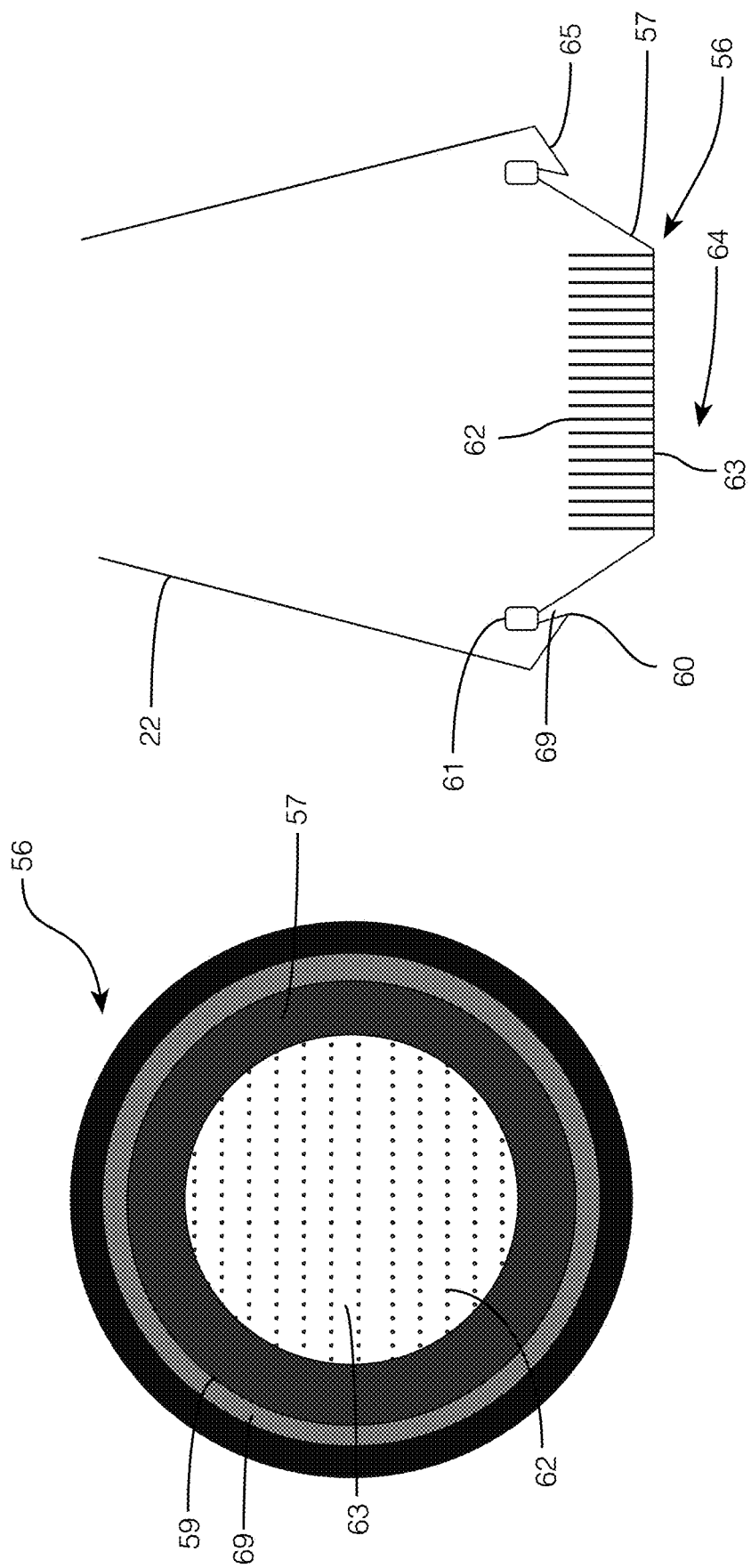

REUSABLE VERTICAL TAKE-OFF AND LANDING SPACE LAUNCH VEHICLE

CROSS-REFERENCE TO RELATED APPLICATION

This application is a continuation of and claims priority to U.S. Nonprovisional patent application Ser. No. 15/449,921 for a Space Vehicle System filed on Mar. 4, 2017, the contents of which are incorporated herein by reference in its entirety.

FIELD

This disclosure relates to the field of space vehicle systems. More particularly, this disclosure relates to a space vehicle system having enhanced characteristics for efficient launch and reentry of the space vehicle system.

BACKGROUND

Space flight launch vehicles may be either expendable wherein all or some components of the vehicle are expended after launch of the system or reusable wherein all or some of the components of the vehicle return to earth after launch for reuse in later launches. In a reusable system, costs of additional launches may be substantially reduced by reusing components of the initial system. However, a system may be subject to additional stresses during reentry of the reusable components and those components must be protected to remain viable for reuse during a later launch.

Typical space flight launch vehicles are shaped for maximum efficiency during forward flight of the system, such as during launch. Conventional launch vehicles are characterized by elongate cylindrical bodies having a relatively constant cross-sectional shape from a nose of the vehicle to a tail of the vehicle. This conventional shape induces various aerodynamic and thermal stresses on the vehicle during launch and flight. Increased stresses on the vehicle may require additional supporting structure or thermal resistant materials, thereby increasing a weight of the vehicle.

Conventional launch vehicles are further not typically effective in withstanding forces on the vehicle during reentry and descent of the system. For example, when the launch vehicle descends, various aerodynamic and thermal loads are placed on a fuselage of the system that differ from loads placed on the vehicle during launch and ascent of the vehicle. Reinforcing the launch vehicle to withstand loads placed on the vehicle during reentry and descent may further increase a weight of the vehicle, thereby increasing a required fuel load for launch of the vehicle.

What is needed, therefore, is a space vehicle system that has improved aerodynamic characteristics that increase an aerodynamic efficiency of the vehicle during launch and that is capable of withstanding aerodynamic and thermal stress during reentry and descent of the vehicle.

SUMMARY

The above and other needs are met by a space launch vehicle that has improved aerodynamic characteristics that increase an aerodynamic efficiency of the vehicle during launch and that is capable of withstanding aerodynamic and thermal stress during reentry and descent of the vehicle. In a first aspect, a space launch vehicle is provided including: a first section having a surface and expanding in width from a nose end of a space vehicle to a trailing edge of the first section, wherein the first section shields a forward portion of the spacecraft during launch, ascent and forward flight; a second section having a surface and narrowing in width from a first end adjacent the trailing edge of the first section to a second end distal from the first end, wherein the second section shields the forward portion of the spacecraft during reentry and descent of the vehicle; a third section having a surface and a first end adjacent to the second end of the second section and a second end that is distal from the first end, the third section having a substantially continuous width along a length of the third section; a fourth section having a surface and expanding in width from a first end adjacent to the second end of the third section to a tail end of a space vehicle; and a fifth section including a heat shield formed on a tail surface of the space vehicle adjacent to the fourth section.

In one embodiment, the space launch vehicle further includes a shock cone and spike formed on the nose end of the space vehicle. In another embodiment, the multi-planar space vehicle fuselage further includes a cargo bay located within the third section. In yet another embodiment, the multi-planar space vehicle fuselage further includes one or more air intakes formed in the third surface of the third section.

In one embodiment, a maximum width of the fourth section at the tail end of the space vehicle is wider than a maximum width of the first section.

In another embodiment, the multi-planar space vehicle fuselage further includes cascading isolator plates formed on the surface of the first section, the surface of the second section, and the surface of the fourth section. In yet another embodiment, each of the isolator plates includes a leading surface and a trailing surface, and wherein the leading surface has a slope that is shallower than a slope of the trailing surface.

In another embodiment, the multi-planar space vehicle fuselage further includes a plurality of landing legs attached to the fuselage.

In one embodiment, the multi-planar space vehicle fuselage further includes a skirt formed around the fuselage adjacent the second end of the second section.

In another embodiment, the multi-planar space vehicle further includes an aerospike nozzle formed on an aft end of the vehicle at the fifth section. In yet another embodiment, the aerospike nozzle includes: a truncated spike including an outer edge and a surface formed on a rear portion of the truncated spike; a plurality of injectors on the surface of the truncated spike for emitting a gas from the surface of the truncated spike into a recirculation region behind the space vehicle; and an annular ring outlet formed on the fifth section between the outer edge of the truncated spike and an inner edge of the fifth section. In one embodiment, the truncated spike further includes a plurality of heat resistant tiles located on the surface of the truncated spike.

In a second aspect, a space launch vehicle is provided including: a shock cone and spike formed on the nose end of the space vehicle; a first section adjacent to the shock cone and spike and having a surface and expanding in width from a nose end of a space vehicle to a trailing edge of the first section, the first section including a plurality of first cascade plates formed on the surface at least partially along a length of the first section, wherein the first section shields a forward portion of the spacecraft during launch, ascent and forward flight; a second section having a surface and narrowing in width from a first end adjacent the trailing edge of the first section to a second end distal from the first end, the second section including a plurality of second cascade plates formed on the surface at least partially along a length of the second section, wherein the second section shields the forward portion of the spacecraft during reentry and descent of the vehicle; a third section having a surface and a first end adjacent to the second end of the second section and a second end that is distal from the first end, the third section having a substantially continuous width along a length of the third section; a fourth section having a surface and expanding in width from a first end adjacent to the second end of the third section to a tail end of a space vehicle, the fourth section including a plurality of fourth section cascade plates formed on the surface at least partially along a length of the fourth section; and a fifth section including a heat shield formed on a tail surface of the space vehicle adjacent to the fourth section.

In a third aspect, a space launch vehicle is provided including: a shock cone and spike formed on the nose end of the space vehicle; a first section adjacent to the shock cone and spike and having a surface and expanding in width from a nose end of a space vehicle to a trailing edge of the first section, the first section including a plurality of first cascade plates formed on the surface at least partially along a length of the first section, wherein the first section shields a forward portion of the spacecraft during launch, ascent and forward flight; a second section having a surface and narrowing in width from a first end adjacent the trailing edge of the first section to a second end distal from the first end, the second section including a plurality of second cascade plates formed on the surface at least partially along a length of the second section, wherein the second section shields the forward portion of the spacecraft during reentry and descent of the vehicle; a third section having a surface and a first end adjacent to the second end of the second section and a second end that is distal from the first end, the third section having a substantially continuous width along a length of the third section; a fourth section having a surface and expanding in width from a first end adjacent to the second end of the third section to a tail end of a space vehicle, the fourth section including a plurality of fourth section cascade plates formed on the surface at least partially along a length of the fourth section; a fifth section including a heat shield formed on a tail surface of the space vehicle adjacent to the fourth section; and cascading isolator plates formed on the surface of the first section, the surface of the second section, and the surface of the fourth section.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 4 shows a bottom view of an aerospike nozzle of a space vehicle according to one embodiment of the present disclosure;

FIG. 5 shows a cross-sectional side view of an aerospike nozzle of a space vehicle according to one embodiment of the present disclosure;

DETAILED DESCRIPTION

Various terms used herein are intended to have particular meanings. Some of these terms are defined below for clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
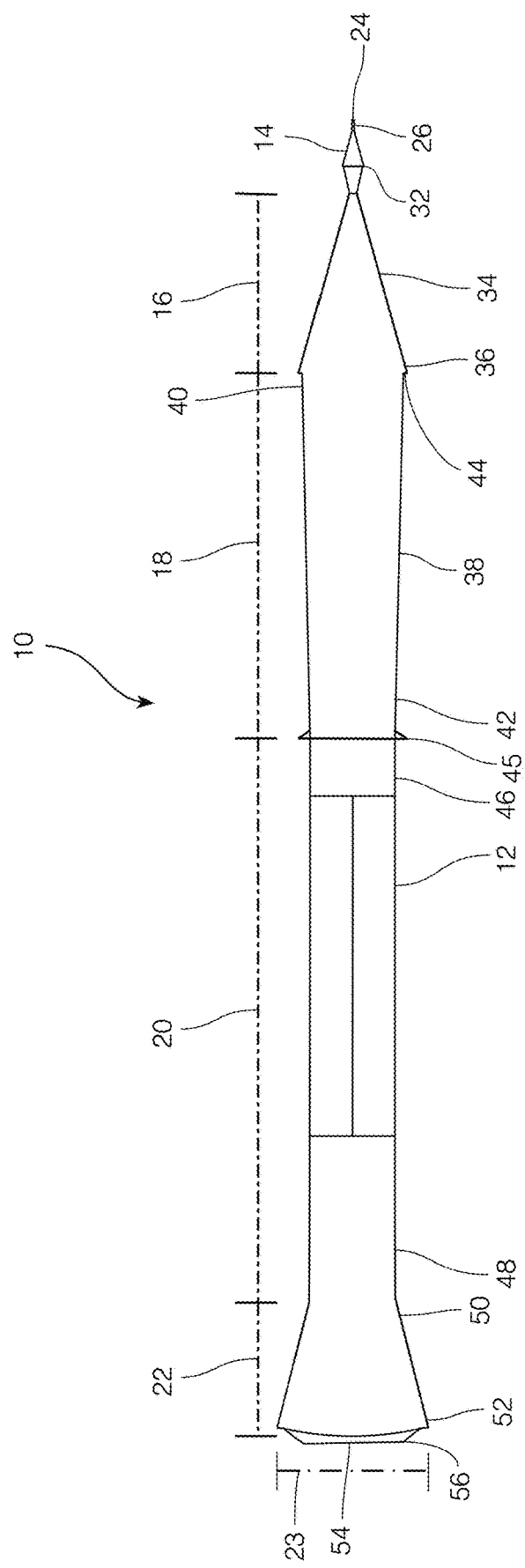
FIG. 1 shows a schematic side view of a space vehicle according to one embodiment of the present disclosure.

FIG. 1 shows a basic embodiment of a space launch vehicle 10 that includes enhanced characteristics for improved efficiency during launch and reentry of the space launch vehicle 10. The space launch vehicle 10 is shaped to withstand aerodynamic and thermal stress encountered during various stages of launch and reentry. Aerodynamic characteristics of the space launch vehicle 10 reduce stresses on at least portions of the space launch vehicle 10 and allow the space launch vehicle 10 to function as a vertical takeoff vertical landing ("VTVL") reusable single-stage-to-orbit ("SSTO") vehicle.

The space launch vehicle 10 includes a multi-planar fixed geometry planned fuselage 12 ("MPFGPF") that defines a shape of the space launch vehicle 10. Surfaces of the fuselage 12 may include a plurality of isolators to protect the space launch vehicle 10 from stresses during launch and reentry. In addition to a geometry of the space launch vehicle 10, additional systems manage a balance of weight onboard the vehicle and otherwise adjust characteristics of the vehicle to optimize the vehicle for both launch and reentry flight conditions.

Multi-Planar Fixed Geometry Planned Fuselage

The fuselage 12 of the space launch vehicle 10, as shown in FIG. 1, includes planar surfaces formed on the fuselage that are shaped to resist thermal and aerodynamic stresses on the vehicle 10 during both launch and reentry conditions. The vehicle 10 is formed into sections of surfaces on the fuselage 12 that are each shaped withstand aerodynamic and thermal stresses on the vehicle during various stages of launch and reentry.

The fuselage 12 preferably includes a shock cone 14, a first section 16, a second section 18, a third section 20, a fourth section 22, and a fifth section 23 formed along a length of the space launch vehicle 10. The sections of the fuselage 12 include surfaces that may be located on a windward side of the vehicle 10 wherein the surfaces are facing a free stream or a leeward side of the vehicle 10 wherein the surfaces are isolated from the free stream. Surfaces of the vehicle 10 may be located on a windward side when the vehicle travels in a forward direction, such as during launch, and may also be located on a leeward side when the vehicle travels in a reverse direction, such as during reentry of the space launch vehicle 10.

The shock cone 14 is formed on a nose end 24 of the space launch vehicle 10. A tip of the shock cone 14 is formed as a tapered and blunt spike 26 that initially contacts air as the space launch vehicle 10 is moving in a forward direction, such as during launch of the vehicle 10. The shock cone 14 is tapered and expands in width from the front end 30 to a middle portion 32 of the shock cone 14. The shock cone 14 is then formed into a reverse taper wherein the shock cone 14 narrows in width from the middle portion 32 to an end of the shock cone 14 that is adjacent to first section 16 of the fuselage 12.

The first section 16 of the fuselage 12 abuts the shock cone 14. The first section 16 is formed into a tapered cone and includes an outer surface 34 that expands in width from the nose end 24 to a trailing edge 36 of the first section 16. The outer surface 34 is oriented as a windward-facing surface when the space launch vehicle 10 is moving in a forward direction such that the leading end 28 of the vehicle 10 first encounters air during launch, ascent, and flight of the vehicle 10.

The second section 18 of the fuselage 12 abuts the trailing edge 36 of the first section 16 and is formed into a reverse-tapered cone such that an outer surface 38 of the second section 18 narrows in width from a first end 40 adjacent to the trailing edge 36 towards a second end 42 near a midpoint of a length of the fuselage 12. A width of the first end 40 of second section 18 at the trailing edge 36 is preferably less than a width of first section 16 at the trailing edge 36 such that a leeward-facing lip 44 is created between the first section 16 and the second section 18. The second section 18 tapers in width from the first end 40 to the second end 42. The second section 18 is preferably sloped at an angle that is shallower than an angle of the slope of the first section 16 and preferably has a length that is longer than a length of the first section 16, as shown in FIG. 1. The second section 18 tapers to a width that is preferably equal to a width of the third section 20, as discussed in greater detail below.

As shown in FIG. 1, a skirt 45 may be formed around the fuselage 12 of the space launch vehicle 10 adjacent the second end 42 of the second section 18. The skirt 45 includes a sloped leading edge and a substantially flat trailing edge. During launch and forward flight of the space launch vehicle 10, the skirt 45 protects the third section 20 of the fuselage 10 while during descent and landing the flat trailing edge of the skirt 45 may slow a flow of air around the fuselage to aid in braking of the vehicle 10.

The third section 20 preferably includes a substantially flat surface along a length of the third section. A first end 46 of the third section 20 is located adjacent to the second end 42 of the second section 18. The third section 20 preferably has a diameter that is approximate or equal to a diameter of the second end 42 of the second section 18 such that a smooth surface is formed along a transition from the second section 18 to the third section 20. The third section 20 is formed into a substantially continuous cross-sectional width along a length of the third section 20 to a second end 48 of the third section 20.

The fourth section 22 is formed adjacent to the second end 48 of the third section 20 and forms a tail section of the fuselage 12. The fourth section 22 is formed into a tapered cone expanding in diameter from a first end 50 adjacent to the second end 48 of the third section 20 to a second end 52 of the fourth section.

The fifth section 23 includes a heat shield 54 is formed on a tail surface of the fuselage 12 for shielding the vehicle 10 during reentry and descent. The heat shield 54 is located on the tail surface of the vehicle 10 such that during reentry and descent wherein the vehicle 10 is travelling in a direction that is reverse from a direction of flight during launch and ascent, the heat shield 54 is on a windward surface of the vehicle 10 and shields the vehicle 10 from thermal loads during reentry. The heat shield 54 is preferably formed of a plurality of heat resistant tiles, such as reinforced carbon or ceramic tiles placed on the tail surface of the fuselage 12.

The fourth section 22 preferably includes one or more landing legs formed along the fourth section 22 for supporting the vehicle 10 during landing. The landing legs may be formed similar to known existing legs utilized on VTVL vehicles. For example, the landing legs may be folding landing legs that are retracted during launch and flight and that are extended during landing of the vehicle 10. While the above description contemplates the landing legs being located on the fourth section 22 of the vehicle 10, it is also understood that the landing legs may be mounted along other sections of the vehicle 10.

The first section 16, second section 18, third section 20, fourth section 22, and fifth section 23 provide a shape of the vehicle 10 that reduce drag and increase lift and stability of the vehicle 10 during both launch and reentry. During launch and ascent of the vehicle 10, the first section 16 faces the flow of air and shields the second section 18 and third section 20 from thermal and mechanical stresses. Drag is induced on the vehicle 10 by the first section 16, while the second section 18 creates a region of recirculation such that air along the second section 18 moves slower than air along the first section 16. The region of recirculation at the second section 18 counteracts drag induced on the first section 16 by pushing against the second section 18 and creating lift on the vehicle 10. At least part of the fourth section 22 also faces the stream during launch and ascent of the vehicle 10. A flow of air along the third section 20 is laminar and higher velocity than a flow along the second section 18, making the third section 20 a preferable location for an air intake 21 for a propulsion system of the vehicle 10. When the vehicle 10 is moving in a forward direction, such as during launch, ascent, and forward flight, the second section 18 is a leeward surface and an area of recirculation and turbulent air flow. Air flowing along the second section 18 is of lower speed and higher pressure, causing lift on the second section 18 of the vehicle 10 and stabilizing the vehicle 10 during flight.

The shape of the vehicle 10 including the various sections described herein further induces positive static stability of the vehicle 10. Regions of pressure and recirculation along the fuselage 12 of the vehicle 10 encourage the vehicle 10 to maintain a direction of flight when the vehicle 10 is moving in a forward direction.

During reentry and descent of the vehicle 10, the vehicle 10 is travelling in a substantially reverse direction such that the heat shield 54 is facing the flow of air, the fourth section 22 and first section 16 are on leeward facing sides of the vehicle 10. During descent, the second section 18 is on a windward side of the vehicle 10 and faces the flow of air. Compression, a consequence of the flow of air on the windward-facing second section 18 act to slow a descent of the vehicle 10 during descent.

Cascading Isolator Plates

Figure 2:
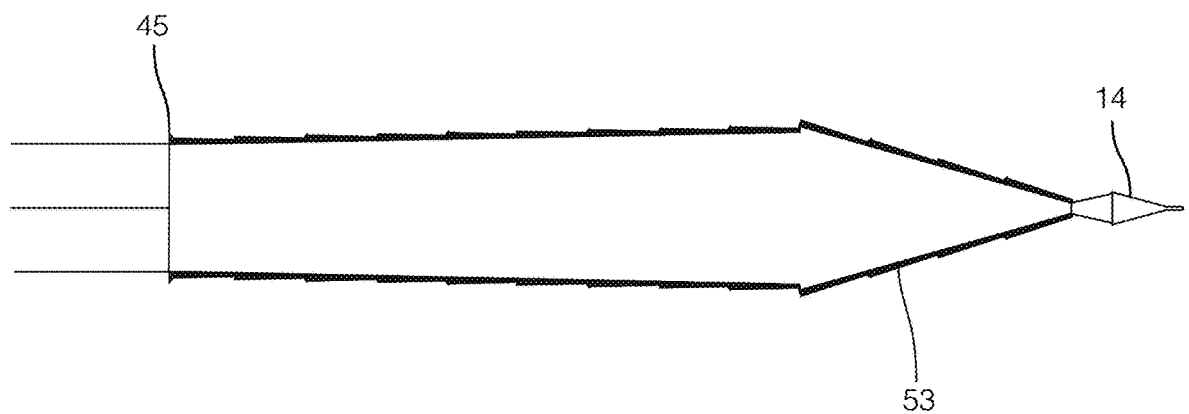
FIGS. 2 and 3 show side views of a space vehicle including cascading plates according to embodiments of the present disclosure.
Figure 3:
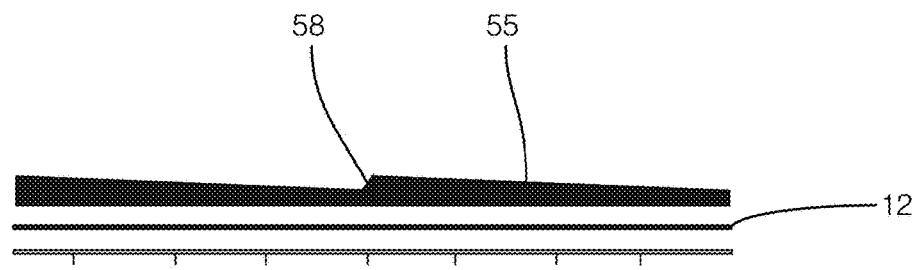

Referring now to FIGS. 2 and 3, in one embodiment a plurality of cascading plates 53 are formed on surfaces of the fuselage 12 to isolate portions of the fuselage 12 from friction and thermal and mechanical loads. The cascading plates 53 are preferably formed on the outer surface 34 of the first section 16 and the outer surface 38 of the second section 18, as shown in FIG. 1. The cascading plates 53 are also preferably formed on the outer surface 34 of the fourth section 22. The cascading plates 53 may also be formed on any outer surfaces of any landing legs or other structures of the fourth section 22 to shield those components during launch and reentry. The cascading plates 53 are preferably formed of a high temperature material for protecting the fuselage 12 from thermal stress on the vehicle 10 during launch and reentry. The cascading plates 53 include a sloped leading surface 55 and a sloped trailing surface 58. The sloped leading surface 55 is preferably sloped at an angle that is shallower than the sloped trailing surface 58 of the cascading plates 53.

The cascading plates 53 formed on the vehicle 10 isolate portions of the fuselage 12 from thermal and mechanical loads during ascent and descent and further dissipate heat generated during flight. The cascading plates 53 located on surfaces of the vehicle 10 create multiple shock waves along portions of the fuselage 12 that isolate portions of succeeding shock cones from oncoming air flow, thereby reducing the total drag and friction of the isolated portions and collectively to the vehicle 10. The shock cone 14 creates an initial isolation effect prior to air contacting the first section 16 of the fuselage 12 to create an initial isolation effect before air reaches the cascading plates 53 formed on the fuselage 12.

Aerospike Nozzle

Referring to FIGS. 4 and 5, the vehicle 10 preferably includes an aerospike nozzle 56 formed on an aft end of the vehicle 10 at the tail surface of the fuselage 12. The aerospike nozzle 56 preferably includes a truncated spike 57 extending from the aft end of the vehicle 10. An annular ring outlet 58 is formed between an outer edge 59 of the truncated spike 57 and an inner edge 60 of the fifth section 23 (FIG. 1). In one embodiment, one or more mechanical doors or actuating petals are located around the annular ring outlet 58 to cover and protect the annular ring outlet 58 during reentry of the vehicle 10. A sloped trailing edge 65 is formed between an outer surface of the fourth section 22 and the inner edge 60 of the fifth section 23 to aid in re-attaching a flow of air from the outer surface of the fourth section 22 to the truncated spike 57.

A plurality of nozzles 61 are annularly located around the truncated spike 57 and direct exhaust gases towards the truncated spike 57 and out of the aft end of the vehicle 10. A plurality of injectors 62 are formed on a surface 63 of the truncated spike 57 and are preferably in communication with a combustion system of the vehicle 10 or other source of gas such that fuel, oxidizer, or other gases are emitted from the injectors 62 into a recirculation region 64 formed behind the truncated spike 57 during launch and forward flight of the vehicle 10. The surface 63 of the truncated spike 57 preferably includes a plurality of heat resistant tiles forming the heat shield 54 to protect the vehicle 10 during reentry and descent of the vehicle 10.

During launch and flight of the vehicle 10, oxidizer and fuel are combusted at the nozzles 61 and the resulting exhaust is directed onto the truncated spike 57. During flight, a flow of air from the fourth section 22 of the fuselage 12 recirculates adjacent the fifth section 23 and the recirculating flow pushes the exhaust towards the truncated spike 57. One or more of fuel, oxidizer, and other gases are emitted from the injectors 62 into the recirculation region 64 where they may be ignited by the exhaust gases, thereby generating additional thrust against the surface 63 of the truncated spike 57. While fuel or oxidizer are preferably emitted from the injectors 62 into the recirculation region 64, it is also understood that various other gases may be emitted from the injectors 62 into the recirculation region 64, thereby increasing pressure in the recirculation region 64.

Capsule Bay and Door

Figure 6:
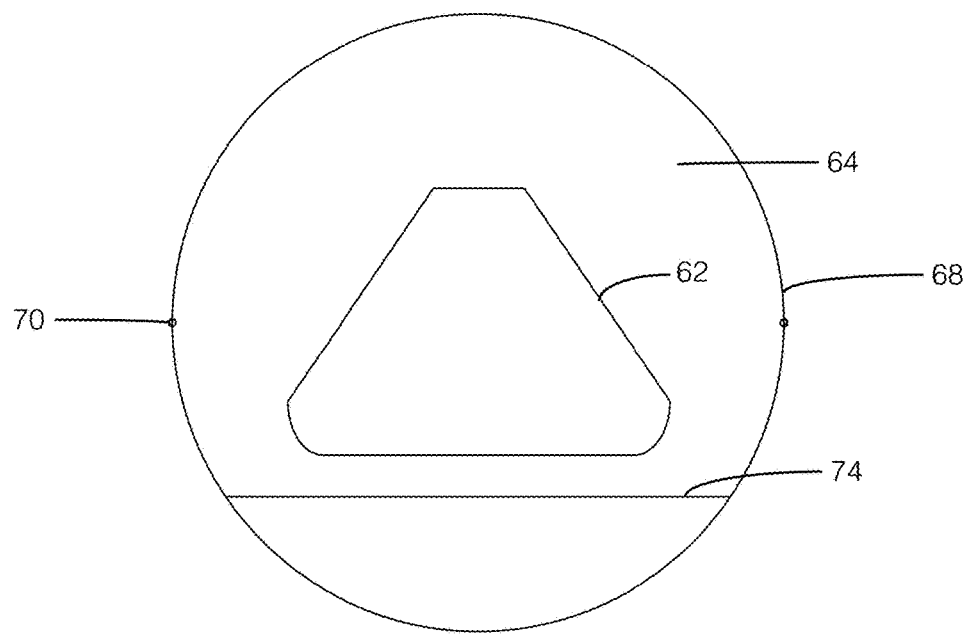
FIG. 6 shows a cross-sectional view of a capsule bay according to one embodiment of the present disclosure.
Figure 7:
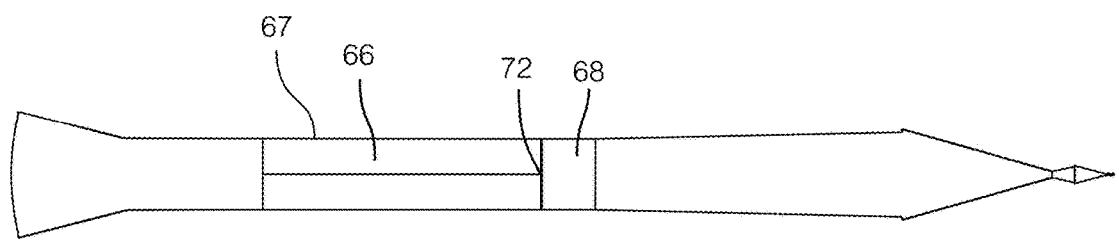
FIG. 7 shows a top view of a space launch vehicle according to one embodiment of the present disclosure.
Figure 8:
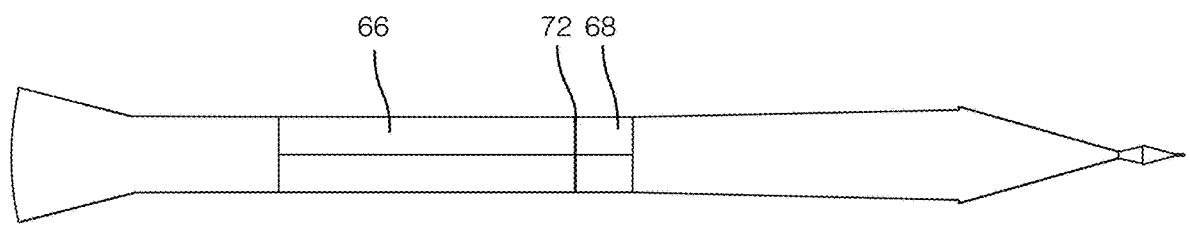
FIG. 8 shows a side view of a space launch vehicle according to one embodiment of the present disclosure.

Referring now to FIGS. 6-8, the space launch vehicle 10 further includes a capsule bay 64 located within the fuselage 12 of the space launch vehicle 10. The capsule bay 64 is preferably located along a midpoint of the space launch vehicle 10 and encloses a capsule 62 adjacent to a main cargo bay 66. The main cargo bay 66 includes a cargo bay door 67 that may either be formed as opposing hinging doors or a single piece door mounted on hinges at one side of the door 67. The capsule bay 64 includes a capsule bay door 68 attached to the fuselage with one or more explosive bolts 70 and an explosive hinge 72. The capsule 62 is located within the capsule bay 64 adjacent to a capsule rest 74 for supporting the capsule 62 within the fuselage 12.

The capsule bay door 68 is configured to be jettisoned in an emergency such that the capsule 62 may be ejected from the space launch vehicle 10. The explosive bolts 70 and explosive hinge 72 may be activated during an abort sequence. Rockets or other propulsion systems may jettison the capsule bay door 68 from a side of the fuselage 12. The capsule 62 may include one or more rockets that are activated to eject the capsule 62 out of the side of the space launch vehicle 10 and away from the vehicle 10. The capsule bay door 68 is semicircular in shape, thereby only requiring the capsule bay door 68 to be jettisoned during an abort sequence for the capsule to be ejected, thereby reducing a size and number of components to be jettisoned during abort of a launch or flight sequence.

The space launch vehicle advantageously provides a reusable vehicle configured for VTVL wherein a mechanical load and forces primarily act on a single axis along a length of the vehicle. The space launch vehicle includes enhanced aerodynamic characteristics that allow the vehicle to operate in both a forward direction during launch and flight and in a reverse direction during reentry and descent.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A reusable vertical take-off and landing space launch vehicle comprising:
    an aerospike nozzle formed on an aft end of the vehicle;
    a truncated spike formed on the aerospike nozzle and including an outer edge and a heat resistant surface formed on a rear portion of the truncated spike;
    an annular ring outlet formed around the truncated spike at the aft end of the vehicle between the outer edge of the truncated spike and an inner edge of the aft end of the space vehicle;
    a middle fuselage section located between the aerospike nozzle and a nose end of the space vehicle and having a diameter that is less than a diameter of the aerospike nozzle, wherein the heat resistant surface of the truncated spike shields the middle fuselage section of the space vehicle during reentry of the space vehicle.

2. The reusable vertical take-off and landing space launch vehicle of claim 1, further comprising a plurality of injectors on the surface of the truncated spike for emitting a gas from the surface of the truncated spike into a recirculation region behind the space vehicle.

3. A reusable vertical take-off and landing space launch vehicle comprising:
- an aerospike nozzle formed on an aft end of the vehicle;
- a truncated spike formed on the aerospike nozzle and including an outer edge and a heat resistant surface formed on a rear portion of the truncated spike;
- a plurality of injectors on the surface of the truncated spike for emitting a gas from the surface of the truncated spike into a recirculation region behind the space vehicle;
- an annular ring outlet formed around the truncated spike at the aft end of the vehicle between the outer edge of the truncated spike and an inner edge of the aft end of the space vehicle;
- a middle fuselage section located between the aerospike nozzle and a nose end of the space vehicle and having a diameter that is less than a diameter of the aerospike nozzle, wherein the heat resistant surface of the truncated spike shields the middle fuselage section of the space vehicle during reentry of the space vehicle.

\* \* \* \* \*